United States Patent
Han

(10) Patent No.: US 7,049,785 B2
(45) Date of Patent: May 23, 2006

(54) APPARATUS AND METHOD OF CONTROLLING A STEPPER MOTOR

(75) Inventor: Suk-gyun Han, Sungnam (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

(21) Appl. No.: 10/601,860

(22) Filed: Jun. 24, 2003

(65) Prior Publication Data

US 2004/0036439 A1 Feb. 26, 2004

(30) Foreign Application Priority Data

Aug. 20, 2002 (KR) .............................. 2002-49316

(51) Int. Cl.
- H02P 8/12 (2006.01)
- H02P 8/14 (2006.01)
- H02P 7/06 (2006.01)
- G05B 19/40 (2006.01)

(52) U.S. Cl. .................. 318/696; 318/685; 318/689; 318/432; 318/434

(58) Field of Classification Search ............ 318/696, 318/685, 138, 439, 254, 689, 55, 798, 806, 318/432, 433, 434

See application file for complete search history.

(56) References Cited

U.S. PATENT DOCUMENTS

| | | | | |
|---|---|---|---|---|
| 4,298,940 A | * | 11/1981 | Tadokoro et al. | 318/52 |
| 4,680,526 A | * | 7/1987 | Okuyama et al. | 318/802 |
| 4,799,161 A | * | 1/1989 | Hirotsu et al. | 318/52 |
| 5,424,960 A | * | 6/1995 | Watanabe et al. | 318/696 |
| 5,640,943 A | * | 6/1997 | Tasaka et al. | 318/685 |
| 5,739,661 A | * | 4/1998 | Wakuda | 318/685 |
| 5,838,132 A | * | 11/1998 | Tanaka | 318/685 |
| 6,025,691 A | * | 2/2000 | Kawabata et al. | 318/700 |
| 6,037,741 A | * | 3/2000 | Yamada et al. | 318/721 |
| 6,150,788 A | * | 11/2000 | Someya | 318/685 |
| 6,324,038 B1 | * | 11/2001 | Kishibe et al. | 361/31 |
| 6,384,563 B1 | * | 5/2002 | Someya | 318/700 |
| 6,397,969 B1 | * | 6/2002 | Kasai et al. | 180/404 |
| 6,759,822 B1 | * | 7/2004 | Marusarz | 318/268 |
| 2002/0189301 A1 | * | 12/2002 | Hosoito et al. | 68/12.02 |
| 2003/0214265 A1 | * | 11/2003 | VanderZee et al. | 318/685 |

FOREIGN PATENT DOCUMENTS

| | | | |
|---|---|---|---|
| CN | 1134065 | | 10/1996 |
| JP | 08051795 A | * | 2/1996 |
| JP | 08317696 A | * | 11/1996 |
| JP | 10290598 A | * | 10/1998 |

OTHER PUBLICATIONS

Office Action issued from Chinese Patent Office on Nov. 26, 2004.

* cited by examiner

*Primary Examiner*—Edgardo San Martin
(74) *Attorney, Agent, or Firm*—Staas & Halsey LLP

(57) ABSTRACT

An apparatus and method of controlling a stepper motor, includes a torque calculator to calculate torque operated on the stepper motor and to output to a controller a driving current setting signal corresponding thereto. The controller outputs to a driver a control signal to apply variable driving current based on the driving current setting signal to the stepper motor. The driver drives the stepper motor based on the control signal inputted from the controller. Accordingly, overheating and inaccurate operations of a control IC (the controller) and the stepper motor may be prevented, and driving characteristics such as low power consumption, low vibration and low noise of the stepper motor may be improved.

14 Claims, 3 Drawing Sheets

APPARATUS AND METHOD OF CONTROLLING A STEPPER MOTOR

CROSS REFERENCE TO RELATED APPLICATION

This application claims the benefit of Korean Application No. 2002-49316, filed Aug. 20, 2002, in the Korean Intellectual Property Office, the disclosure of which is incorporated herein by reference.

BACKGROUND OF THE INVENTION

1. Field of the Invention

The present invention relates to an apparatus and method of controlling a stepper motor, and more particularly, to an apparatus and method to variably control a driving current applied to the stepper motor according to a torque operated on the stepper motor.

2. Description of the Related Art

A stepper motor rotates by a fixed angle in every changed state of excitation in each phase of the motor by clock pulse signals, and suspends at a fixed angle if the state of excitation does not change. The stepper motor rotates by the fixed angle or by a fixed step according to inputted pulse signals.

FIG. 1 is a schematic block diagram illustrating a conventional apparatus to control a stepper motor.

As shown in FIG. 1, a controller 100 outputs to a driver 110 driving pulse signals for each phase to drive a stepper motor 120. The controller 100 also outputs to the driver 110 a control signal that applies a predetermined driving current according to a preset driving current setting value Vref to the stepper motor 120.

The driving current applied to the stepper motor 120 is usually determined with a predetermined additional current so as to prevent a rotor of the stepper motor 120 from stepping out. When the rotor of the stepper motor 120 starts rotating from a suspended state, it requires greater torque than is required to maintain its rotation after the stepper motor 120 has been running. Taking this into consideration, the driving current setting value Vref is set to be greater than required to start the rotor from the suspended state. Thus, the driving current applied to the stepper motor 120 is usually more than actually required to drive the stepper motor 120.

The driver 110 drives the stepper motor 120 with the predetermined driving current according to the control signal outputted from the controller 100.

As the conventional apparatus to control the stepper motor 120 is configured so that the predetermined additional current for a magnitude of a rotary torque is applied to prevent the rotor of the stepper motor from stepping out, the rotor reaches a target position with repeated overshoot and settling in every step. Therefore, the conventional apparatus incurs problems of vibration, noise and resonance due to the additional driving current for an extra torque of the rotor, and also incurs problems of inaccurate operations of an overheated control IC (controller) and the stepper motor.

SUMMARY OF THE INVENTION

Accordingly, it is an aspect of the present invention to provide an apparatus and method of controlling a stepper motor to prevent overheating of a control IC and the stepper motor, and to offer driving characteristics with low power consumption, low vibration and low noise.

Additional aspects and advantages of the invention will be set forth in part in the description which follows and, in part, will be obvious from the description, or may be learned by practice of the invention.

The foregoing and/or other aspects of the present invention are achieved by providing an apparatus to control a stepper motor including a torque calculator to calculate torque applied to the stepper motor and to output a driving current setting signal corresponding to the calculated torque. The apparatus also includes a controller to output a control signal to apply variable driving current which is based on the driving current setting signal, to the stepper motor, and a driver to drive the stepper motor based on the control signal inputted from the controller.

According to an aspect of the invention, the apparatus includes a current detector to detect driving current flowing into the stepper motor and to output the detected driving current to the torque calculator.

According to an aspect of the invention, the torque calculator includes an A/D converter to convert the inputted driving current into digital signals, a CPU (Central Processing Unit) to calculate the torque using information on the AND converted driving current and to read driving current setting information corresponding to the calculated torque information, and a D/A converter to convert the read driving current setting information into analog signals.

According to an aspect of the invention, the apparatus includes a storage unit to store the driving current setting information corresponding to the calculated torque information therein.

According to another aspect of the invention, the storage unit stores the calculated torque information and the corresponding driving current setting information therein, causing the torque to be proportional to the driving current.

The foregoing and/or other aspects of the present invention are achieved by providing a method of controlling a stepper motor including outputting a signal corresponding to torque applied to the stepper motor, outputting a driving control signal to apply variable driving current to the stepper motor based on a driving current setting signal, and driving the stepper motor based on the driving control signal.

According to an aspect of the invention, the outputting the signal corresponding to the torque applied to the stepper motor includes detecting driving current flowing in each excited phase of the stepper motor; A/D converting driving current detected in each excited phase, calculating the torque based on information on the driving current, reading driving current setting information corresponding to the calculated torque information, and D/A converting the driving current setting information and outputting the D/A converted information.

According to an aspect of the invention, the driving current setting signal causes the driving current to be applied to the stepper motor in proportion to the torque applied to the stepper motor.

DETAILED DESCRIPTION OF THE PREFERRED EMBODIMENTS

Figure 1:
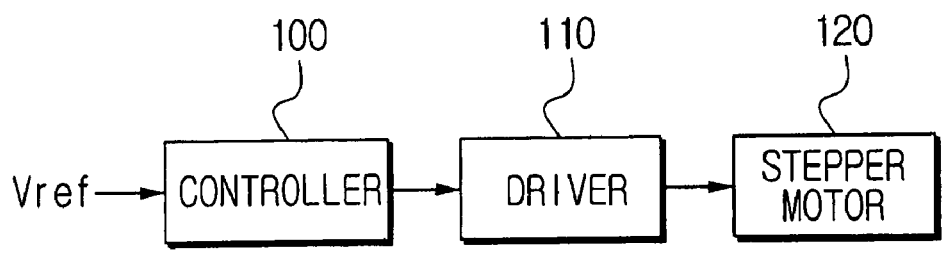
FIG. 1 is a schematic block diagram illustrating a conventional apparatus to control a stepper motor.

Reference will now be made in detail to the present preferred embodiments of the present invention, examples of which are illustrated in the accompanying drawings, wherein like reference numerals refer to like elements throughout.

Figure 2:
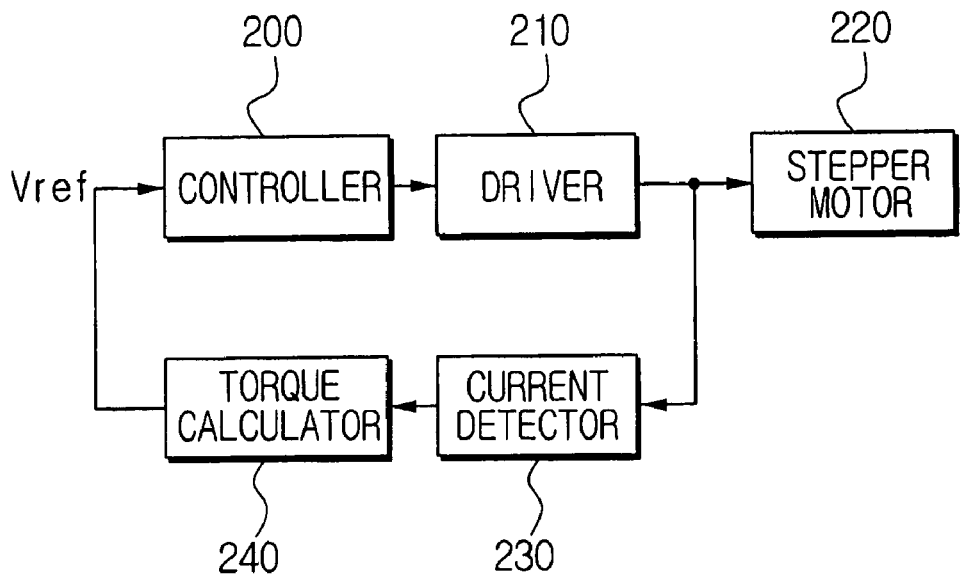
FIG. 2 is a schematic block diagram illustrating an apparatus to control a stepper motor, according to an embodiment of the present invention.

FIG. 2 is a schematic block diagram illustrating an apparatus to control a stepper motor, according to an embodiment of the present invention. As shown in FIG. 2, the apparatus to control the stepper motor includes a controller 200, a driver 210, a current detector 230 and a torque calculator 240.

The controller 200 outputs a control signal to apply variable driving current to a stepper motor 220. The variable driving current varies according to a variation of an input driving current setting signal Vref.

The driver 210 applies the variable driving current to the stepper motor 220 according to the control signal inputted from the controller 200, thereby driving the stepper motor 220. The current detector 230 detects a current flowing into the stepper motor 220 and outputs the detected current to a torque calculator 240.

The torque calculator 240 outputs a predetermined driving current setting signal to the controller 200 upon initial power supply. The torque calculator 240 A/D converts the current inputted from the current detector 230, and calculates a torque applied to the stepper motor 220 based on the current inputted from the current detector 230. Furthermore, the torque calculator 240 reads driving current setting information which corresponds to the calculated torque and outputs a D/A converted driving current setting signal to the controller 200.

Figure 3:
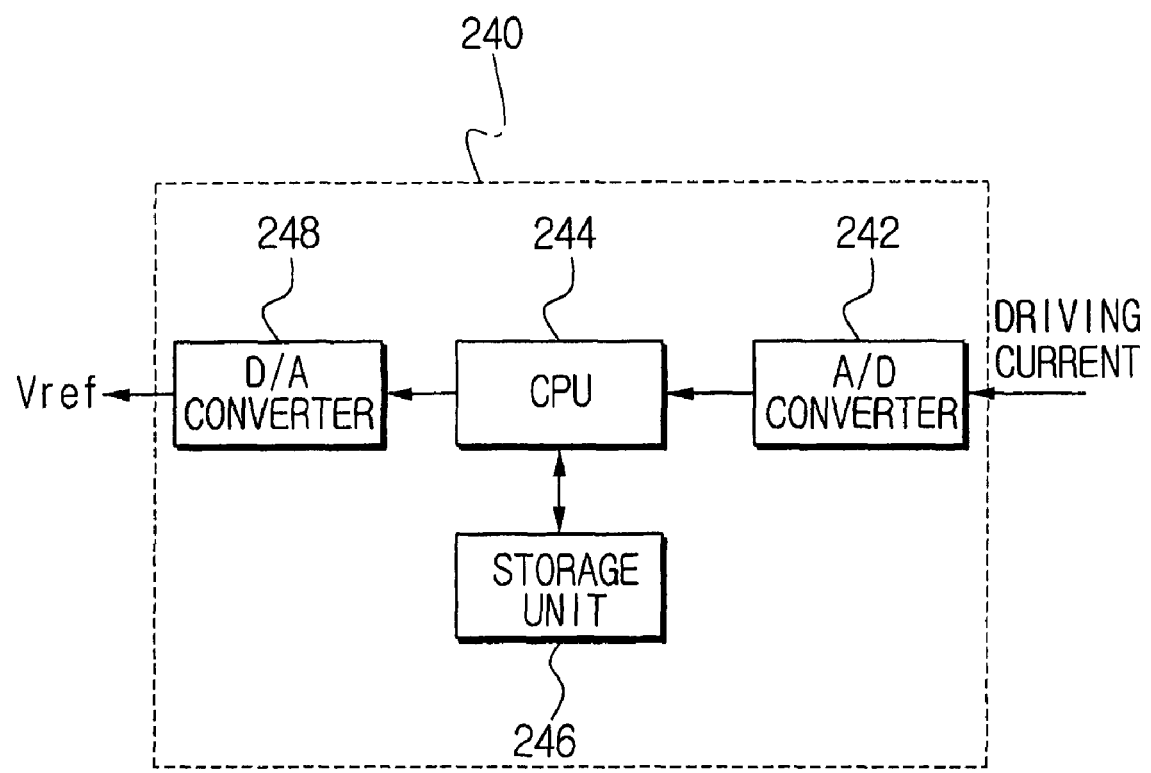
FIG. 3 is a detailed block diagram illustrating a torque calculator of FIG. 2.

FIG. 3 is a detailed block diagram illustrating a torque calculator of FIG. 2. As shown in FIG. 3, the torque calculator 240 includes an A/D converter 242, a CPU 244, a storage unit 246, and a D/A converter 248. The A/D converter 242 converts current input from the current detector 230 in each excited phase of the stepper motor 220 into digital signals, and outputs the converted signals to the CPU 244.

The CPU 244 calculates a magnitude of the torque applied to the stepper motor 220 using information on an amount of current in each excited phase of the stepper motor 220. The information is inputted from the A/D converter 242. Since the method of calculating the torque based on the current is widely known, it is not illustrated in detail herein. Nonetheless, the CPU 244 reads the driving current setting information corresponding to the calculated torque information from the storage unit 246, and outputs the read information to the D/A converter 248.

The D/A converter 248 outputs to the controller 200 the driving current setting signal (i.e., the D/A converter 248 outputs an analog signal converted from the driving current setting information outputted from the CPU 244). The storage unit 246 stores the driving current setting information corresponding to the calculated torque information.

Table 1 shows an example of the driving current setting information corresponding to the torque information stored in the storage unit 246.

TABLE 1

| TORQUE INFORMATION | DRIVING CURRENT SETTING INFORMATION |
|---|---|
| 1.50 | 3.0 |
| 1.81 | 3.5 |
| 2.10 | 4.0 |
| 2.33 | 4.5 |

As shown in Table 1, the torque information and the driving current setting information are proportional to each other. Accordingly, the torque calculator 240 outputs to the controller 200 the driving current setting signal which is proportional to the magnitude of the torque applied to the stepper motor 220.

As a result, by applying the variable driving current to the stepper motor 220, a torque margin of the stepper motor 220 stays constant.

Figure 4:
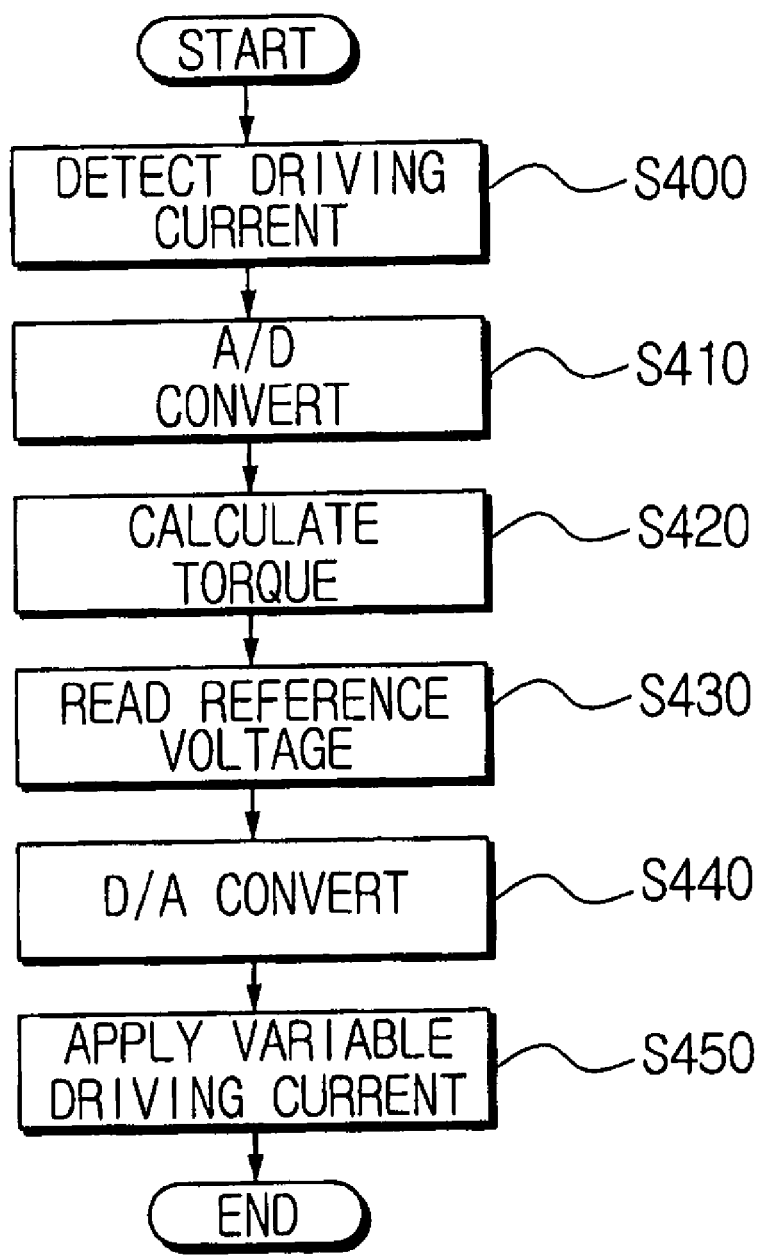
FIG. 4 is a flowchart illustrating operations of the apparatus to control the stepper motor of FIG. 2.

Hereinbelow, a method of controlling the stepper motor of the present invention will be explained with reference to FIG. 4.

The current detector 230 detects current flowing in each excited phase of the stepper motor 220 and outputs the detected current to the torque calculator 240 (operation S400).

The A/D converter 242 of the torque calculator 240 converts the current in each excited phase into digital signals and outputs the converted signal to the CPU 244 of the torque calculator 240 (operation S410).

The CPU 244 calculates the magnitude of the torque applied to the stepper motor 220 based on excitation current information in each excited phase inputted from the A/D converter 242 (operation S420). Then the CPU 244 reads driving current setting information Vref (or reference voltage) corresponding to calculated torque information from the storage unit 246, and outputs the read information to the D/A converter 248 of the torque calculator 240 (operation S430).

The D/A converter 248 outputs to the controller 200 the driving current setting signal (i.e., outputs the analog signal converted from the driving current setting information inputted from the CPU 244 (operation S440)).

The controller 200 outputs a control signal to the driver 210 to apply to the stepper motor 220 the variable driving current based on the driving current setting signal inputted from the D/A converter 248. Then the driver 210 drives the stepper motor 220 with the variable driving current based on the control signal of the controller 200 (S450).

The apparatus and method of controlling a stepper motor in accordance with the present invention prevents overheating and inaccurate operations of the control IC (controller) and the stepper motor, and improves driving characteristics such as low power consumption, low vibration and low noise of the stepper motor.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus to control a stepper motor to which a driving current is applied, the apparatus comprising:
   a torque calculator to calculate torque applied to the stepper motor from current flowing in each excited phase of the stepper motor and from stored driving current settings and to output a driving current setting signal corresponding to the calculated torque;

a controller to output a control signal to apply variable driving current which is based on the driving current setting signal, to the stepper motor; and a driver to drive the stepper motor based on the control signal inputted from the controller, wherein the variable driving current is proportional to a magnitude of the torque applied to the stepper motor, so that a torque margin is maintained in a constant state.

2. The apparatus according to claim 1, further comprising:

a current detector to detect the current flowing in each excited phase of the stepper motor and to output the detected current to the torque calculator.

3. The apparatus according to claim 2, wherein the torque calculator comprises:

an A/D converter to convert the inputted current into digital signals;

a CPU to calculate the torque using information on the A/D converted current and to read driving current setting information corresponding to the calculated torque information; and a D/A converter to convert the read driving current setting information into analog signals.

4. The apparatus according to claim 3, further comprising:

a storage unit to store the driving current setting information corresponding to the calculated torque information therein.

5. The apparatus according to claim 4, wherein the storage unit stores the calculated torque information and the corresponding driving current setting information therein, causing the torque to be proportional to the driving current.

6. The apparatus according to claim 1, wherein the variable driving current varies according to a variation of the driving current setting signal inputted to the controller.

7. The apparatus according to claim 6, wherein the driver applies the variable driving current to the stepper motor according to the control signal inputted from the controller to drive the stepper motor.

8. The apparatus according to claim 2, wherein the torque calculator converts the detected current inputted from the current detector to calculate the torque applied to the stepper motor.

9. The apparatus according to claim 3, wherein the CPU calculates a magnitude of the torque applied to the stepper motor using information on an amount of current flowing in each excited phase of the stepper motor.

10. The apparatus according to claim 9, wherein the magnitude of the torque applied to the stepper motor is proportional to the driving current setting signal.

11. A method of controlling a stepper motor to which a driving current is applied, the method comprising:

outputting a driving current setting signal corresponding to torque applied to the stepper motor, the torque being computed from current flowing in each excited phase of the stepper motor and from stored driving current setting information;

outputting a driving control signal to apply variable driving current to the stepper motor based on the driving current setting signal; and driving the stepper motor based on the driving control signal, wherein the variable driving current is proportional to a magnitude of the torque applied to the stepper motor, so that a torque margin is maintained in a constant state.

12. The method according to claim 11, wherein the outputting of the signal corresponding to the torque applied to the stepper motor comprises:

detecting the current flowing in each excited phase of the stepper motor;

A/D converting the current detected in each excited phase;

calculating the torque based on information on the current;

reading the driving current setting information corresponding to the calculated torque information; and D/A converting the driving current setting information and outputting the D/A converted information.

13. The method according to claim 11, wherein the driving current setting signal causes the driving current to be applied to the stepper motor in proportion to the torque applied to the stepper motor.

14. A method of controlling a stepper motor to which a driving current is applied, the method comprising:

calculating torque applied to the stepper motor from current flowing in each excited phase of the stepper motor and from stored driving current settings and outputting a driving current setting signal corresponding to the calculated torque;

outputting a control signal to apply variable driving current which is based on the driving current setting signal, to the stepper motor; and driving the stepper motor based on the control signal inputted from the controller, wherein the variable driving current is proportional to a magnitude of the torque applied to the stepper motor, so that a torque margin is maintained in a constant state.

* * * * *